United States Patent [19]

Brown et al.

[11] 4,382,635
[45] May 10, 1983

[54] PLASTIC VEHICLE WHEEL COVER

[75] Inventors: Trevor J. Brown, Rochester; Neal S. Hakken, Union Lake, both of Mich.

[73] Assignee: General Motors Corporation, Detroit, Mich.

[21] Appl. No.: 234,420

[22] Filed: Feb. 13, 1981

[51] Int. Cl.³ .............................................. B60B 7/06
[52] U.S. Cl. .............................. 301/37 TP; 301/37 P; 301/37 S
[58] Field of Search .................. 301/37 R, 37 P, 37 S, 301/37 TP, 37 B, 108 R, 108 A; 411/372, 373

[56] References Cited

U.S. PATENT DOCUMENTS

| | | | |
|---|---|---|---|
| 1,320,551 | 11/1919 | Holley | 301/108 R |
| 2,819,929 | 1/1958 | Hunt | 301/108 |
| 2,973,226 | 2/1961 | Ellies | 301/37 |
| 3,111,347 | 11/1963 | Miller et al. | 301/108 |
| 3,135,558 | 6/1964 | Johnston et al. | 301/37 P |
| 4,012,078 | 3/1977 | Meyers | 301/37 |
| 4,123,111 | 10/1978 | Renz et al. | 301/37 |
| 4,133,583 | 1/1979 | Spisak | 301/37 |

FOREIGN PATENT DOCUMENTS

| | | | |
|---|---|---|---|
| 55-102702 | 8/1980 | Japan | 301/37 R |
| 48489 | 12/1909 | Switzerland | 411/373 |

Primary Examiner—H. Grant Skaggs
Attorney, Agent, or Firm—Herbert Furman

[57] ABSTRACT

A plastic vehicle wheel cover includes a cover body provided with integral elongated slightly tapered tubular extensions, each being slotted, to provide a plurality of cantilevered fingers which are provided with abutments which snap into a circumferential groove in a lug nut to mount the cover on a vehicle wheel.

2 Claims, 3 Drawing Figures

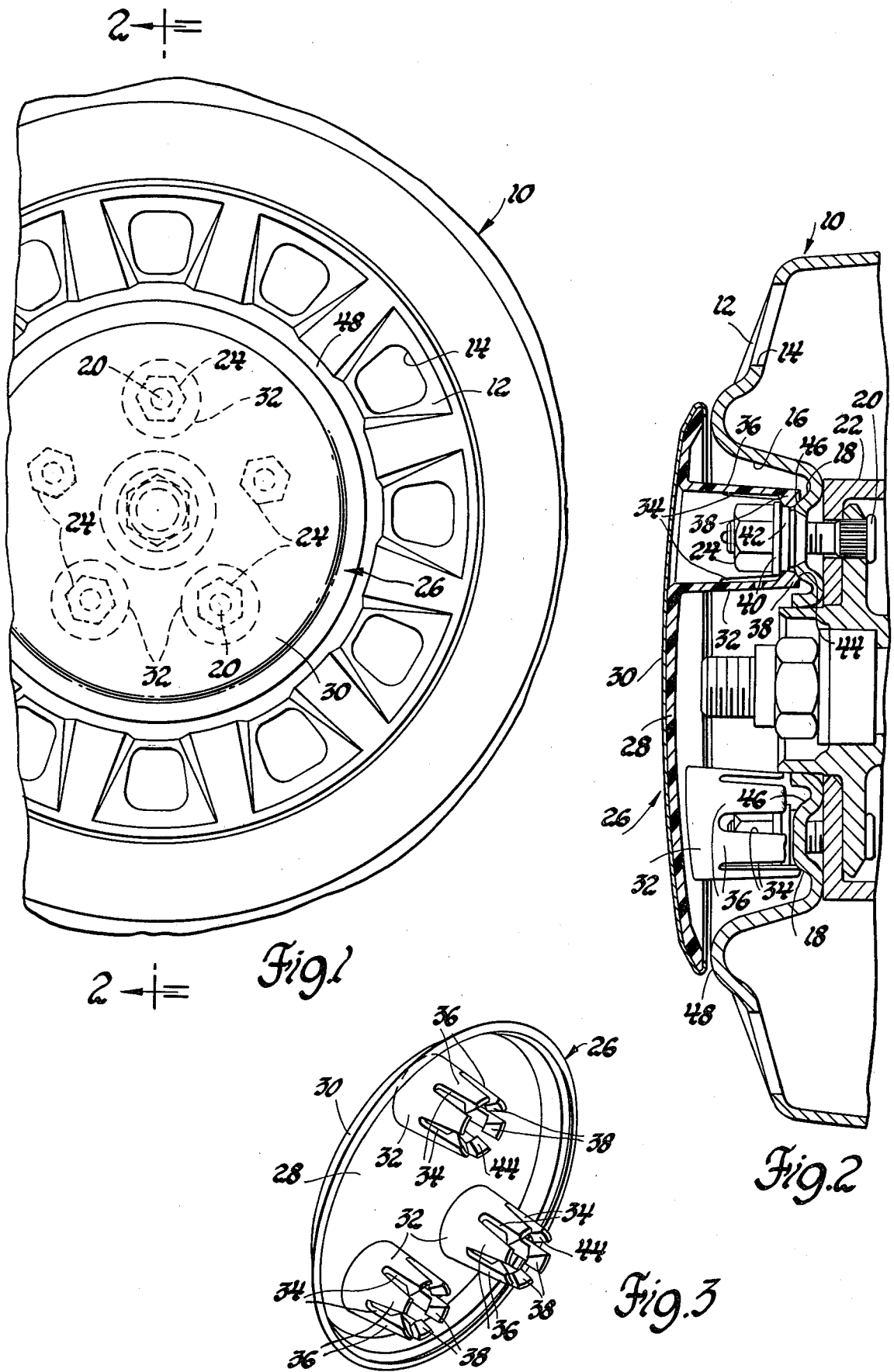

PLASTIC VEHICLE WHEEL COVER

This invention relates to plastic vehicle wheel covers with integral retention and more particularly to such covers which are integrally retained on the lug nuts of the vehicle wheel.

BACKGROUND OF THE INVENTION

Plastic vehicle wheel covers are known in the prior art. Generally such covers are retained on the vehicle wheel by various types of metal clips or fasteners which are assembled to the wheel cover after molding and grippingly engage one or more portions of the vehicle wheel. It is also known to provide a plastic vehicle wheel cover with integral prongs as shown in Meyers U.S. Pat. No. 4,012,078, Wheel Cover Snap On Fastener, issued Mar. 15, 1977. This plastic vehicle wheel cover requires that the wheel hub be specially manufactured in order that the wheel cover be mounted thereon. The wheel hub is provided with a plurality of axial outwardly embossed apertured areas, equal in number to the retaining prongs of the cover, to receive the prongs which mount the wheel cover on the wheel. The apertured areas would have to be finished in a secondary operation in order to remove all sharp edges which would cut into the prongs during mounting and removal of the cover and possibly lead to loss of retention of the cover to the wheel. Additionally, a multiple action mold would be required in order to mold the prongs and the associated structure. A simple type of male-female mold together with the attendant advantages of such a mold, cannot be used to mold the prongs and attendant structure. Additionally, the prongs have to be accurately lined up with each of their respective apertures in order to mount the cover on the wheel.

SUMMARY OF THE INVENTION

The plastic vehicle wheel cover of this invention is integrally retained on the lug nuts of a vehicle wheel and does not require that the wheel be specially manufactured or specially finished so that a mass production wheel can be used. In the preferred embodiment of the invention, the plastic wheel cover is provided with a number of integral elongated tubular extensions which are less in number than the number of lug nuts, since a maximum of three extensions are normally required in order to retain the cover on the wheel. Each extension is slightly tapered and is partially axially slotted at its inner apical end to provide a plurality of cantilevered fingers. Each finger includes an integrally molded radially extending abutment adjacent its apical end. When the cover is mounted on the wheel, the extensions are aligned with a like number of lug nuts and then the cover is moved axially inwardly of the wheel so that the cantilevered fingers separate slightly as the abutments thereof pass over the lug nut and into engagement with a circumferential groove in the lug nut adjacent the hub of the wheel. Concurrently with engagement of the abutments with a respective groove, the fingers engage the hub of the wheel to thereby apply a slight axial outward force to the cover to ensure no axial movement of the cover relative to the wheel as the abutments of the fingers radially grip the groove of a respective lug nut.

From the foregoing description it can be seen that no changes are required to a conventional vehicle wheel in order that the wheel accept the wheel cover of this invention. While the lug nuts require a radial outwardly opening circumferential groove, such nuts can be used on all wheels, whether such wheels have the cover of this invention mounted thereon or other types of wheel covers. Thus no additional cost is required in order to use the wheel cover of this invention or any other wheel cover on a mass production wheel.

Additionally, the wheel cover is molded in a simple type of male-female plastic mold without requiring the use of any cam or other type of multiple action mold in order to properly mold either the cover body or the extensions together with the fingers and abutments.

The primary feature of this invention is that it provides a plastic vehicle wheel cover with integral retention which is interchangeably useable on conventional vehicle wheels with other conventional types of vehicle wheel covers. A further feature of this invention is that the cover is integrally retained by the cooperating interengagement of tubular extensions of the cover with the lug nuts which mount the wheel to the vehicle, with the number of extensions being less than the number of lug nuts. A further feature of this invention is that the extensions are axially slotted adjacent their axially inner ends so as to be divided into a plurality of cantilever like fingers which mutually cooperate with the lug nuts to retain the wheel cover thereto. Yet another feature of this invention is that the fingers of each extension include integral radially extending abutments which resiliently engage within a radial opening groove of a respective lug nut to resiliently grip such nut and thereby retain the cover on the wheel. Yet a further feature of this invention is that the gripping engagement of the abutments and fingers is enhanced by axially locating the cover with respect to the wheel through engagement of portions of the cover with the wheel.

These and other features of the invention will be readily apparent from the following specification and drawings wherein:

FIG. 1 is a partial plan view of a vehicle wheel having a cover according to this invention mounted thereon;

FIG. 2 is an enlarged sectional view taken along a plane indicated by line 2—2 of FIG. 1; and FIG. 3 is a partial perspective view of a portion of the cover.

Referring now to the drawings, a conventional vehicle wheel includes a hub portion 10 and a rim portion, not shown. The hub portion 10 includes a series of axially inwardly offset embossments 12, each of which is apertured at 14 for cooling and decorative purposes. The drop center portion 16 of the hub is conventionally outwardly offset at 18 and apertured at five places for receipt of the attachment studs 20 of the vehicle axle structure 22. Lug nuts 24 are threaded on studs 20 to mount the wheel on the axle structure 22 on the vehicle. Any type of conventional vehicle wheel can be used in place of the wheel briefly described hereinbefore.

The wheel cover 26 of this invention includes a circular cover body 28 of molded plastic material which is covered by an outer skin or cover 30 of bright metal. The cover 30 is clinched over the peripheral edge of the cover body 28. Molded integrally with the cover body 28 is a series of integral elongated tubular extensions 32. In the specific embodiment shown, three such extensions 32 are provided as shown in FIG. 1 and these extensions are axially located on the bolt circle of the wheel whereby the extensions may be axially aligned with any three of the lug nuts 24 as will be further described. Each extension 32 is slightly tapered from its basal axially outer end integrally connected with the cover body 28 to its apical axially inner end. The outer axial openings of the extensions are covered by the outer skin 30. More such extensions may be provided if desired although normally three such extensions are required to retain the cover 26 to the vehicle wheel. As best shown in FIG. 3, each extension 32 is partially slotted at 34 at six places to provide a plurality of cantilevered fingers 36. The slots 34 extend axially of each extension from the inner apical end thereof and are formed in the extensions during molding of the extensions and the cover body. Each of the fingers 36 is additionally provided with an integral radially extending abutment 38 which is generally of triangular radial cross-section.

The cover body 28, the extensions, the fingers and the abutments are all integrally molded in a simple type of male-female mold without requiring any multiple action or cam action mold since the flexibility of the fingers permits the abutments to be molded therewith and for the fingers and abutments to flex during removal of the cover from the mold after the molding process.

When it is desired to mount the cover 26 on the vehicle wheel, the extensions 32 are aligned with any three of the lug nuts 24 and the cover moved axially inwardly of the drop center portion 16 of the hub. The abutments 38 describe a circle which is slightly less than the circle of the hexagonal portion of the lug nuts so that the fingers 36 slightly separate or flex axially outwardly as the abutments move over the hexagonal portion of the lug nuts. Thereafter the fingers further separate as the abutments mover over an annular rib 40 of the lug nuts until the abutments snap into a circumferential arcuate groove 42 in each respective lug nut. When the abutments are received in the groove 42, the fingers 36 return substantially to their normal molded shape. Concurrently with receipt of the abutments in the groove 42, a radial tapered face 44 of each abutment engages an axially outwardly extending annular face 46 of the apertured embossment 18 to thereby provide a slight axial outward force on each extension to prevent axial shifting movement of the extensions relative to the lug nuts.

It will be noted that the cover body is slightly spaced from the wheel hub and if removal is desired, any suitable tool can be inserted between the cover body and an annular rib 48 of the hub so as to apply an axially outward force to the cover body and cam the abutments 38 out of the grooves 42 and over the ribs 40 to permit removal of the cover.

Thus this invention provides an improved plastic vehicle wheel cover with integral retention.

The embodiments of the invention in which an exclusive property or privilege is claimed are defined as follows:

1. The combination comprising, a vehicle wheel mounted to a vehicle by a plurality of circumferentially spaced lug nuts, each lug nut including an annular outwardly opening groove, a plastic wheel cover covering the lug nuts and including a number of integral fastening means engageable with a respective number of lug nuts to retain the cover on the wheel, each fastening means comprising an integral elongated tubular extension extending axially of the cover and tapered from a basal end portion located adjacent the cover to an apical open end portion located axially inwardly of the cover, the basal end portion of each extension being continuous and the remainder of each extension being axially slotted to provide a plurality of fingers of arcuate lateral cross-section cantilevered from the basal end portion and having the sides thereof tapering to the apical end thereof, each finger including an integral abutment adjacent the apical end thereof, each extension receiving a respective lug nut therein with the fingers thereof flexing to permit insertion of the lug nut within the extension until the abutments of the fingers are received in the groove of the lug nut concurrently with engagement of the apical ends of the fingers with the adjacent portion of the vehicle wheel to thereby resiliently and releasably mount the wheel cover on the wheel.

2. The combination comprising, a vehicle wheel mounted to a vehicle by a plurality of circumferentially spaced lug nuts, each lug nut including an annular outwardly opening groove, a plastic wheel cover covering the lug nuts and including a cover body and a number of integral elongated tubular extensions opening through the cover body and extending axially inwardly of the cover body for engagement with a respective number of lug nuts to retain the cover on the wheel, a cover covering the cover body and the openings of the extensions, each extension being tapered from a basal end portion located adjacent the cover body to an apical open end portion located axially inwardly of the cover body, the basal end portion of each extension being continuous and the remainder of each extension being axially slotted to provide a plurality of fingers of arcuate lateral cross-section cantilevered from the basal end portion and having the sides thereof tapering to the apical end thereof, each finger including an integral abutment adjacent the apical end thereof, each extension receiving a respective lug nut therein with the fingers thereof flexing to permit insertion of the lug nut within the extension until the abutments of the fingers are received in the groove of the lug nut concurrently with engagement of the apical ends of the fingers with the adjacent portion of the vehicle wheel to thereby resiliently and releasably mount the wheel cover on the wheel.

* * * * *